(12) United States Patent
Sekine

(10) Patent No.: US 11,534,870 B2
(45) Date of Patent: *Dec. 27, 2022

(54) METAL PARTICLE

(71) Applicant: NAPRA CO., LTD., Tokyo (JP)

(72) Inventor: Shigenobu Sekine, Tokyo (JP)

(73) Assignee: Napra Co., Ltd., Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 17/145,838

(22) Filed: Jan. 11, 2021

(65) Prior Publication Data

US 2022/0219265 A1 Jul. 14, 2022

(51) Int. Cl.
 *B23K 35/02* (2006.01)
 *B23K 35/26* (2006.01)
 *B23K 103/08* (2006.01)

(52) U.S. Cl.
 CPC ........ *B23K 35/0244* (2013.01); *B23K 35/262* (2013.01); *B23K 2103/08* (2018.08)

(58) Field of Classification Search
 CPC .......................... B23K 35/0244; B23K 35/262
 USPC ........................................................ 420/560
 See application file for complete search history.

(56) References Cited

U.S. PATENT DOCUMENTS

| 4,758,407 | A | 7/1988 | Ballentine et al. |
| 7,947,363 | B2 | 5/2011 | Xu et al. |
| 10,016,848 | B2 | 7/2018 | Sekine |
| 10,906,136 | B1 * | 2/2021 | Sekine ................ B23K 35/262 |
| 2015/0146394 | A1 * | 5/2015 | Terashima .............. C22C 13/00 420/561 |

FOREIGN PATENT DOCUMENTS

| CN | 101896301 A | 11/2010 |
| JP | H02-034295 A | 2/1990 |
| JP | 2007-268569 A | 10/2007 |
| JP | 6029222 B1 | 11/2016 |
| JP | 2018-150614 A | 9/2018 |

OTHER PUBLICATIONS

Office Action dated Nov. 1, 2021 issued in the corresponding Chinese Patent Application No. 201911297848.4.
Office Action dated Jun. 8, 2022 issued in the corresponding Chinese Patent Application No. 201911297848.4.

* cited by examiner

*Primary Examiner* — Weiping Zhu
(74) *Attorney, Agent, or Firm* — Carrier Blackman & Associates, P.C.; Joseph P. Carrier; Fulchand P. Shende

(57) ABSTRACT

According to this invention, provided is a metal particle that includes an intermetallic compound composed of Sn, Cu and Ni, in a basal phase that contains Sn and an Sn—Cu alloy, and at least parts of the Sn—Cu alloy and the intermetallic compound in the basal phase form an endotaxial joint.

4 Claims, 8 Drawing Sheets

METAL PARTICLE

INCORPORATION BY REFERENCE

This application is based on Japanese Patent Application No. 2019-154628, filed on Aug. 27, 2019, the content of which is incorporated hereinto by reference.

BACKGROUND OF THE INVENTION

1. Field of the Invention

This invention relates to a metal particle.

2. Description of the Related Art

In an advancing situation of IoT (Internet of Things) with ever-growing needs for energy saving, power semiconductor that holds the key for the technology has been increasingly gaining its importance, while leaving many problems on effective use thereof to be solved. The power semiconductor, which handles high power ascribed to high voltage and large current, produces large amount of heat and becomes hot. Si power semiconductor, although having been suited to a required level of heat resistance of approximately 175° C. at present, are on the way to development towards a Si power semiconductor durable to higher temperatures, approximately at 200° C. Next-generation power semiconductors with use of SiC and GaN, for example, are even required to endure 250 to 500° C.

The best way to enhance the heat resistance might rely upon a technique of joining devices and components onto a Cu substrate that excels in heat dissipation. Difference of coefficients of thermal expansion among the materials would, however, result in breakage of the devices and components, or fracture of a joint material at a joint area. Thus an expensive ceramic substrate whose coefficient of thermal expansion is close to those of the devices and components has been used at present, the situation needing further improvement.

Referring now to the joint material, there has been no joint material which can attain a high level of heat resistance required for the next-generation power semiconductor with use of SiC or GaN.

For example, an SnAgCu-based joint material (powdery solder material) disclosed in JP-A-2007-268569 is no more than a material applicable to the power semiconductor of a class of approximately 125° C., and is not applicable to the next-generation power semiconductor.

For full demonstration of performances of the power semiconductor, it is necessary to avoid the aforementioned breakage of the devices and components, or fracture of the joint material in the joint area, even when materials with different coefficients of thermal expansion are joined. If a joint material having such high heat resistance and high reliability, and free of environmental pollutant such as lead were successfully put into practical use for the power semiconductor, power electronics industry making use of the power semiconductor would grow dramatically.

On the other hand, the present applicant has proposed in Japanese Patent No. 6029222 a metal particle that includes a shell and a core, wherein the core contains a metal or an alloy, the shell contains a mesh structure of an intermetallic compound and covers the core, meanwhile the core contains Sn or Sn alloy, and the shell contains an intermetallic compound of Sn and Cu. The joint area formed of this metal particle has been proven to retain high levels of heat resistance, joint strength and mechanical strength over a long period, even after prolonged operation at high temperatures, or after used in a harsh environment typically involving large temperature change from high temperature operational state down to low temperature idle state.

The metal particle disclosed in Japanese Patent No. 6029222 has a double layered structure with the shell and the core, wherein placement of the intermetallic compound in the shell, between a substrate and an object to be joined, contributes to suppress Cu and so forth from diffusing into the object to be joined, to thereby successfully suppress Kirkendall void from generating. The metal particle has, however, not yet reached reliable mutual joining of the devices and the components having different coefficients of thermal expansion.

CITATION LIST

[Patent Document 1] JP-A-2007-268569
[Patent Document 2] Japanese Patent No. 6029222

SUMMARY OF THE INVENTION

It is therefore an object of this invention to provide a metal particle having heat resistance and joint strength higher than those in the prior art, and is capable of mutually joining any devices and components having different coefficients of thermal expansion in a reliable manner.

The present inventor went through extensive investigations, and found that aforementioned problem can be solved by using a metal particle that contains a specific intermetallic compound in a specific basal phase, and at least parts of the basal phase and the intermetallic compound form an endotaxial joint. The finding led the present inventor to arrive at this invention.

That is, this invention is summarized as follows.

1. A metal particle comprising an intermetallic compound composed of Sn, Cu and Ni, in a basal phase that contains Sn and an Sn—Cu alloy, at least parts of the Sn—Cu alloy and the intermetallic compound in the basal phase forming an endotaxial joint.

2. The metal particle according to 1, including 0.7 to 40% by mass of Cu, 0.1 to 5% by mass of Ni, and the balance of Sn.

3. The metal particle according to 1 or 2, having a particle size of 1 μm to 50 μm.

Advantageous Effects of Invention

Sn has a tetragonal crystal structure within a temperature range from approximately 13° C. to approximately 160° C. (Sn with the tetragonal crystal structure will be referred to as β-Sn), which causes transition to a cubic crystal structure in a lower temperature region (Sn with the cubic crystal structure will be referred to as α-Sn). The β-Sn crystal structure also causes transition to a high temperature phase crystal called orthorhombic crystal structure in a temperature region above approximately 160° C. (Sn with the orthorhombic crystal structure will be referred to as γ-Sn). The phase transition between the tetragonal β-Sn and cubic α-Sn is known to be accompanied by a particularly large volumetric change.

The metal particle of this invention is featured by that it contains a high temperature phase crystal even at approximately 160° C. or below (at room temperature, for example). For example, if the joint material that contains the metal particle is heated during the joining process, so as to bring the joint material into a semi-molten state rather than in full molten state, to thereby create a state containing the endotaxial joint formed between the intermetallic compound and the basal phase, the joint structure will retain a state that contains the high temperature phase crystal even after cooled down into a temperature range of 160° C. or below. Such high temperature phase crystal is less likely to cause phase transition to the tetragonal low temperature β-Sn phase, even if the temperature is lowered down to a certain degree. Sn thus remained unchanged, without causing phase transition into the tetragonal β-Sn, will not cause phase transition into α-Sn, and therefore does not cause a large volumetric change in association with the phase transition into α-Sn under lowered temperature. Hence, even in a temperature range of 160° C. or below (at room temperature, for example), the joint material that contains Sn with the high temperature phase crystal is relieved from a large volumetric change due to temperature change, as compared with other joint material that contains Sn in its chemical composition (that is, Sn having no high temperature phase crystal intentionally contained therein, which is retainable even in a temperature range of 160° C. or below).

The joint structure formed by using the metal particle of this invention retains the endotaxial joint in the metal particle, and preferably retains self-similar (fractal) crystal structure resulted from the endotaxial joint, proving possibility of providing a high level of heat resistance required for the next-generation power semiconductor.

Electronic components employ various metals including Cu, Ag, Au, Ni and so forth, with which Sn can join in a reliable manner.

With the high temperature phase crystal contained therein over a wide temperature range (even at room temperature, for example), and with the tetragonal low temperature β-Sn phase suppressed from generating therein as possible, the metal particle of this invention is featured by its unlikeliness of causing a large volumetric change in association with phase transition from tetragonal β-Sn to cubic α-Sn under temperature change, and can join with various metals employed in electronic components. Hence, the metal particle is especially beneficial to joining of minute joint part.

As described above, this invention can provide a metal particle capable of forming a joint in which the volumetric change is suppressed over a temperature range wider than in the prior art, having heat resistance, joint strength and mechanical strength whose levels are higher than those in the prior art, and capable of mutually joining the devices and the components having different coefficients of thermal expansion.

DESCRIPTION OF THE EMBODIMENTS

This invention will further be detailed below.

Terminology in this patent specification will be defined as follows, unless otherwise specifically noted.

(1) The term "metal" is used not only to encompass metal element as a simple substance, but also occasionally to encompass alloy and intermetallic compound composed of two or more metal elements.

(2) When referring to a certain metal element as a simple substance, it means not only an absolutely pure substance solely composed of such metal element, but also a substance containing a trace amount of other substance. That is, the metal element of course does not mean to exclude a case where a trace impurity that hardly affects properties of that metal element is contained. As for the basal phase for example, it does not mean to exclude a case where a part of atoms in Sn crystal is replaced by other element (Cu, for example). For example, such other substance or other element may account for 0 to 0.1% by mass of the metal particle.

(3) Endotaxial joint means that an intermetallic compound precipitates in a substance which is expected to become metal or alloy (in this invention, the basal phase that contains Sn and an Sn—Cu alloy), wherein the Sn—Cu alloy and the intermetallic compound join during the precipitation while attaining lattice matching, to thereby produce crystal grains. The term "endotaxial" is a known term, which is found for example in the last paragraph on the left column on page 160, in *Nature Chemistry*, 3(2): 160-6, 2011.

A metal particle of this invention is featured by having an intermetallic compound composed of Sn, Cu and Ni, in a basal phase that contains Sn and an Sn—Cu alloy, and at least parts of the Sn—Cu alloy and the intermetallic compound in the basal phase form an endotaxial joint.

Figure 1:
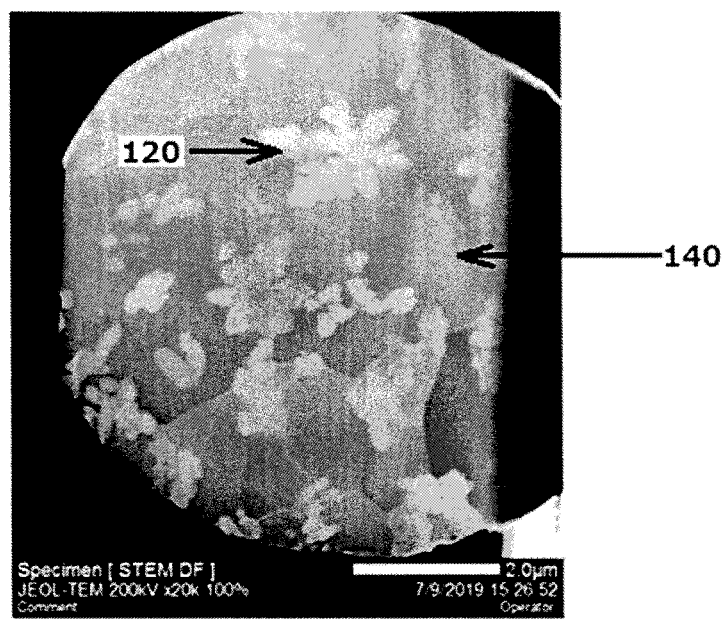
FIG. 1 is a STEM image of a cross section of a metal particle of this invention thinned with focused ion beam (FIB).

FIG. 1 is a STEM image of a cross section of the metal particle of this invention thinned with focused ion beam (FIB). Particle size of the metal particle of this invention, which is approximately 5 μm in FIG. 1, is preferably within the range from 1 μm to 50 μm for example. Referring now to the metal particle in FIG. 1, observed are a basal phase 140 that contains Sn and an Sn—Cu alloy, and resides therein an intermetallic compound 120 that is composed of Sn, Cu and Ni. The intermetallic compound 120 is confirmed to have a self-similar (fractal) crystal structure.

The metal particle of this invention typically contains 0.7 to 40% by mass of Cu, 0.1 to 5% by mass of Ni, and the balance of Sn; and preferably contains 1 to 15% by mass of Cu, 1 to 3% by mass of Ni, and the balance of Sn.

The metal particle of this invention may be manufactured typically from a starting material having a chemical composition represented by 8% by mass of Cu, 1% by mass of Ni and 91% by mass Sn (referred to as 8Cu.91Sn.1Ni, hereinafter). For example, the metal particle is obtainable by melting 8Cu.91Sn.1Ni at approximately 650° C., feeding the molten material onto a dish-like disk which is kept spinning at high speed in a nitrogen atmosphere, so as to centrifugally scatter the molten metal in the form of fine droplets, and by cooling and solidifying the droplets under reduced pressure.

A preferred example of a manufacturing apparatus suitable for manufacture of the metal particle of this invention will be explained referring to FIG. 2. A granulation chamber 1 has a cylindrical top and a conical bottom, and has a lid 2 placed on the top. The lid 2 has a nozzle 3 perpendicularly inserted at the center thereof, and right under the nozzle 3 arranged is a dish-like rotating disk 4. Reference sign 5 represents a mechanism that supports the dish-like rotating disk 4 so as to be movable up and down. At the lower end of the conical bottom of the granulation chamber 1, connected is a discharge pipe 6 through which the produced particles are output. An upper end of the nozzle 3 is connected to an electric furnace (high frequency induction furnace) 7 in which a metal to be granulated is melted. An atmospheric gas, having the chemical composition specifically adjusted in a mixed gas tank 8, is fed through a pipe 9 and a pipe 10, respectively into the granulation chamber 1 and to the top of the electric furnace 7. Inner pressure of the granulation chamber 1 is controlled by a valve 11 and a ventilator 12, and inner pressure of the electric furnace 7 is controlled by a valve 13 and a ventilator 14. The molten metal fed through the nozzle 3 onto the dish-like rotating disk 4 is scattered in the form of fine droplets with the aid of centrifugal force of the dish-like rotating disk 4, and then solidified after cooled under reduced pressure. The thus produced solid particles are fed through the discharge pipe 6 to an automatic filter 15, where the particles are classified. Reference sign 16 represents a particle collector.

A process of bringing the molten metal from the hot molten state down to the cold solidified state is the key for formation of the metal particle of this invention.

The process is carried out under conditions exemplified below.

With the melting temperature of metal in the electric furnace 7 preset to 600° C. to 800° C., the molten metal kept at that temperature is fed through the nozzle 3 onto the dish-like rotating disk 4.

The dish-like rotating disk 4 is a dish-like disk having an inner diameter of 60 mm and a depth of 3 mm, which is rotated at 80,000 to 100,000 rpm.

A vacuum chamber which can be evacuated down to $9 \times 10^{-2}$ Pa or around is employed here as the granulation chamber 1, and is evacuated, to which nitrogen gas conditioned at 15 to 50° C. is fed while concurrently ventilating the chamber, so as to adjust the pressure in the granulation chamber 1 to $1 \times 10^{-1}$ Pa or below.

The metal particle manufactured under such conditions will have a particle size preferably within the range from 1 μm to 50 μm as described above, which is more preferably 5 μm to 40 μm.

Chemical composition of the intermetallic compound in the metal particle of this invention, when expressed in terms of proportion of numbers of Sn, Cu and Ni atoms, is given typically by Sn:Cu:Ni=(40 to 60):(30 to 50):(4 to 9).

The intermetallic compound in the metal particle of this invention typically accounts for 20 to 60% by mass of the whole metal particle, wherein the percentage is more preferably 30 to 40% by mass.

The chemical composition and the percentage of the intermetallic compound may be satisfied by following the aforementioned conditions for manufacturing the metal particle.

The metal particle of this invention can be formed into a sheet or paste, bringing it into contact with an object to be joined, holding them at 160° C. to 180° C. for 3 minutes or longer, then by allowing the sheet or paste to melt at 235° C. to 265° C., and allowed to solidify. A good joint structure can thus be formed.

The sheet that contains, as a material, the metal particle of this invention is obtainable typically by compressing the metal particle between rollers, typically as described below. That is, the metal particle of this invention is fed between a pair of pressure rollers that rotate in opposing directions, and then compressed while being heated through the pressure rollers to approximately 100° C. to 150° C.

The metal particle of this invention is alternatively obtainable in the form of conductive paste, by allowing it to disperse in an organic vehicle.

The sheet or the conductive paste may be formed of a mixture of metal particle, by adding other particle such as SnAgCu-based alloy particle, Cu particle, Cu alloy particle, Ni particle, Ni alloy particle, or mixture of any of these particles. Such other particle may optionally be coated with a metal such as Si.

For example, by combining the metal particle with Cu particle or Ni alloy particle which is more conductive than Sn, obtainable is a metal joint layer which is highly conductive, and whose volumetric change is suppressed over a relatively wide temperature range.

EXAMPLES

This invention will further be explained below referring to Examples and Comparative Examples. This invention is, however, not limited to Examples below.

Example 1

Figure 2:
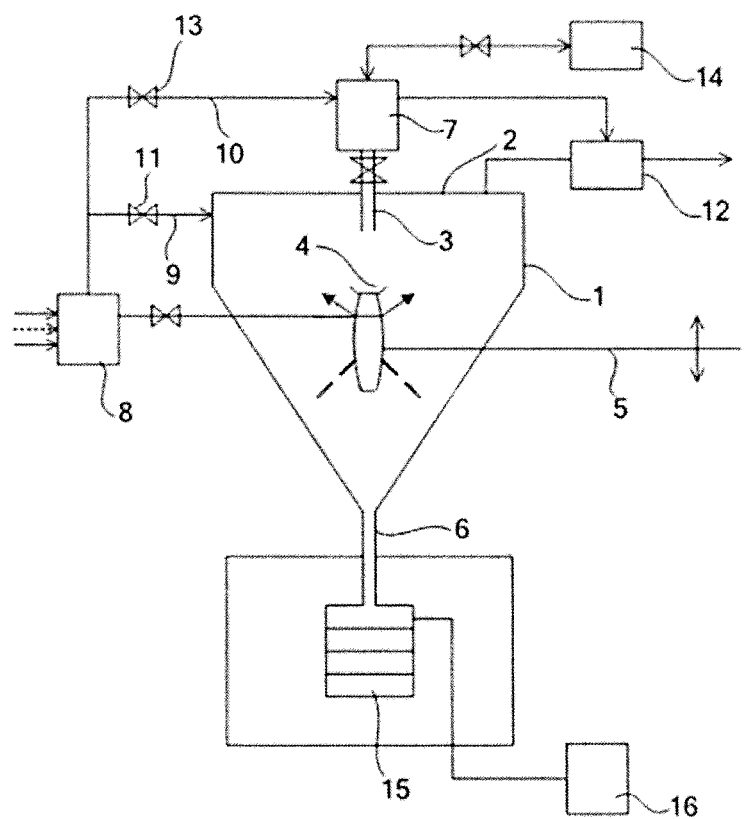
FIG. 2 is a schematic drawing illustrating an exemplary manufacturing apparatus suitably applicable to manufacture of the metal particle of this invention.

A metal particle 1 having a diameter of approximately 3 to 40 μm was manufactured from 8Cu.91Sn.1Ni as a starting material, with use of the manufacturing apparatus illustrated in FIG. 2.

Conditions below were employed for the process.

A melting crucible was placed in the electric furnace 7, into which 8Cu.91Sn.1Ni was placed and melted at 650° C., and while keeping the temperature, the molten metal was fed through the nozzle 3 onto the dish-like rotating disk 4.

The dish-like rotating disk 4 employed here was a dish-like disk with an inner diameter of 60 mm and a depth of 3 mm, which was rotated at 80,000 to 100,000 rpm.

The granulation chamber 1 which can be evacuated down to around $9 \times 10^{-2}$ Pa was evacuated, to which nitrogen gas at 15 to 50° C. was fed and concurrently evacuated, to thereby adjust the inner pressure of the granulation chamber 1 to $1 \times 10^{-1}$ Pa or below.

The obtained metal particle 1 was found to have a cross section presented in FIG. 1.

Figure 3:
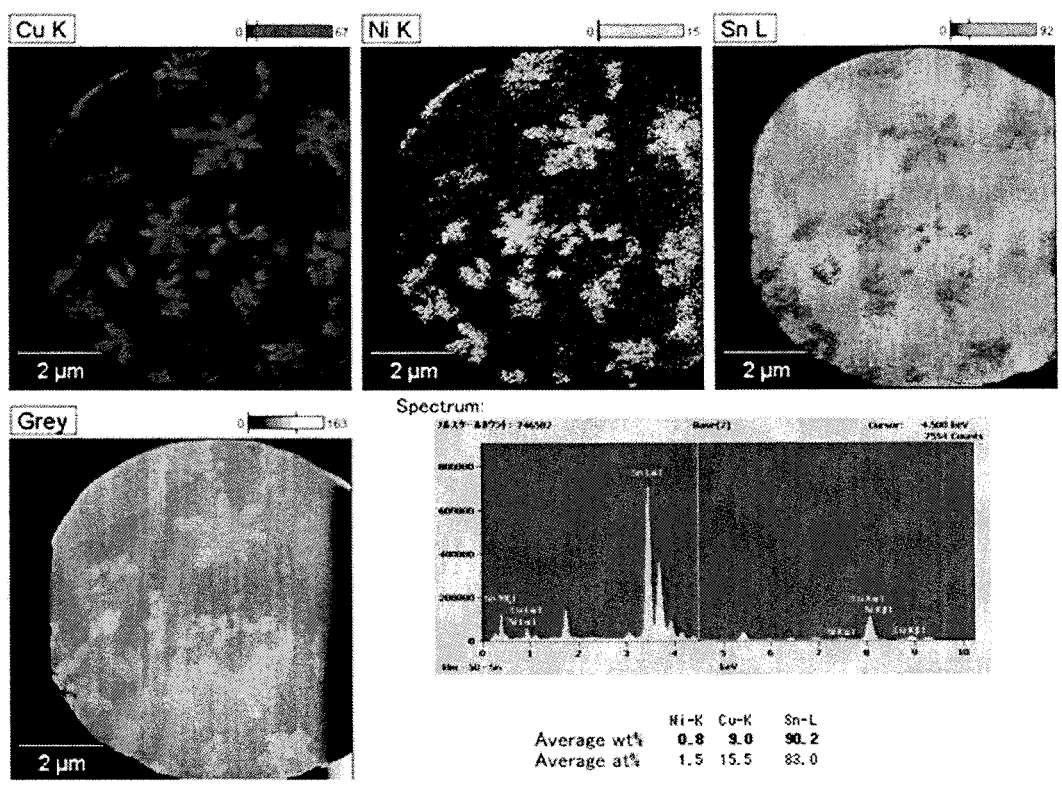
FIG. 3 illustrates results of EDS element mapping obtained from the cross section of the metal particle illustrated in FIG. 1.

FIG. 3 illustrates results of EDS element mapping obtained from the cross section of the metal particle illustrated in FIG. 1. From the analytical results, the metal particle was found to be composed of 10.24% by mass of Cu, 0.99% by mass of Ni, and 88.76% by mass of Sn as the balance.

The intermetallic compound in the metal particle 1 was found to account for 30 to 35% by mass of the metal particle.

Figure 4:
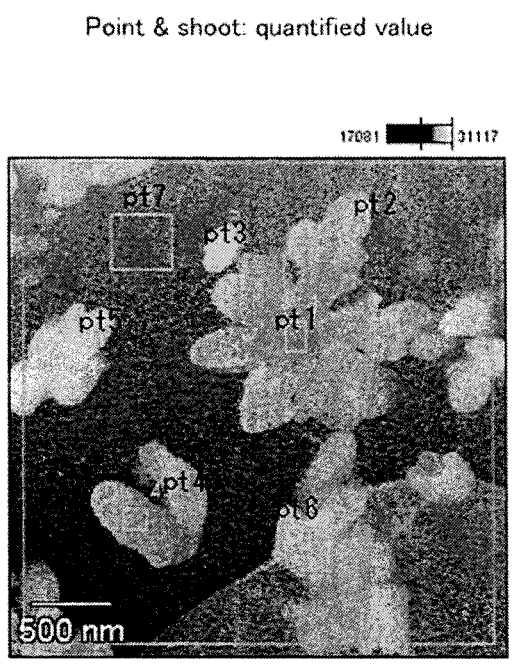
FIG. 4 summarizes quantified values of Cu, Ni and Sn at various points on the cross section of the metal particle illustrated in FIG. 1.

FIG. 4 summarizes quantified values of Cu, Ni and Sn at various points on the cross section of the metal particle 1 illustrated in FIG. 1.

As summarized in FIG. 4, individual points pt1 to pt7 on the cross section of the metal particle were found to give different quantified values of Cu, Ni and Sn.

This indicates that the intermetallic compound forms a fractal crystal structure in the basal phase metal.

Figure 5A:
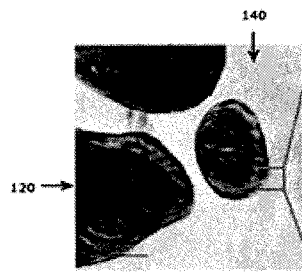
FIGS. 5A and 5B are TEM images of a cross section of the metal particle obtained in Example 1.
Figure 5B:
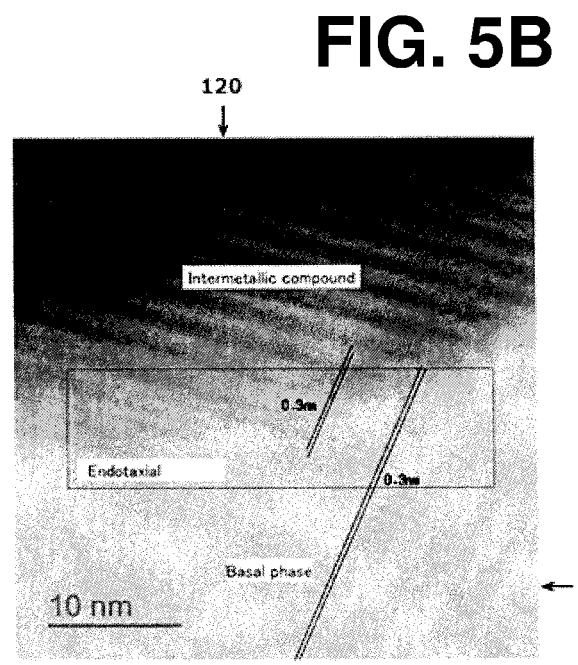
Figure 5C:
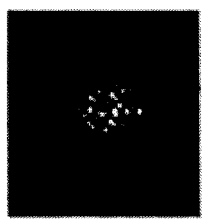
FIG. 5C is a transmission electron diffraction pattern of the metal particle.

FIGS. 5A and 5B are TEM images of the cross section of the metal particle 1, and FIG. 5C is a transmission electron diffraction pattern of the metal particle 1.

Referring now to FIG. 5A, the intermetallic compound 120 composed of Sn, Cu and Ni is found to reside in the basal phase 140 that contains Sn and an Sn—Cu alloy.

FIG. 5B is an enlarged view of a part surrounded by a rectangular frame in FIG. 5A. Referring now to FIG. 5B, lattice constants (and crystal orientations) agree between the basal phase 140 and the intermetallic compound 120 (0.30 nm in FIG. 5B), proving that the individual crystals are joined while attaining lattice matching. That is, the endotaxial joint was confirmed from FIG. 5B indicating joining of the lattices, and also absence of a buffer layer between the crystals was confirmed from FIG. 5(C) that illustrates the transmission electron diffraction pattern of the interface between the basal phase 140 and the intermetallic compound 120.

In the metal particle of this invention, area ratio of the endotaxial joint, when assuming the total area of joint face between the basal phase and the intermetallic compound as 100%, is preferably 30% or larger, and more preferably 60% or larger. The area ratio of the endotaxial joint may be calculated typically as follows.

A cross section of the metal particle, such as presented in FIG. 1, is photographed under an electron microscope, and joint faces between the intermetallic compound and the Sn—Cu alloy are sampled at 50 freely selected points. The joint faces are then examined by image analysis, to thereby determine to what degree the endotaxial joint, such as presented in FIG. 5, resides in the sampled joint faces.

It was also found from FIGS. 5A to 5C that at least a part of Sn in the metal particle of this Example retains the high temperature phase crystal even at normal temperature.

It was also found from FIGS. 5A to 5C that the interface of the endotaxial joint has a fractal crystal structure. With the fractal crystal structure contained therein, the intermetallic compound can overcome its brittleness, the high temperature phase crystal of Sn will become more likely to be retained, devices and components having different coefficients of thermal expansion will be mutually joined in a more reliable manner, and the joint structure will be kept joined reliably, even exposed to high/extremely-low temperature cycles.

Next, the metal particle 1 in a dry powder form was compressed to manufacture a sheet, the sheet was then used for joining a copper substrate and a silicon device, and subjected to a high temperature storage test (HTS) at 260° C. Results indicated that shear strength elevated from approximately 50 MPa up to approximately 60 MPa, over a period ranging from the start of test until approximately 100 hours after, and remained plateau at approximately 60 MPa over a temporal range beyond 100 hours.

On the other hand, temperature cycle test (TCT) ranged from −40 to 200° C. yielded results indicating that the shear strength was stabilized at approximately 50 MPa over the whole cycles (1000 cycles).

Figure 6:
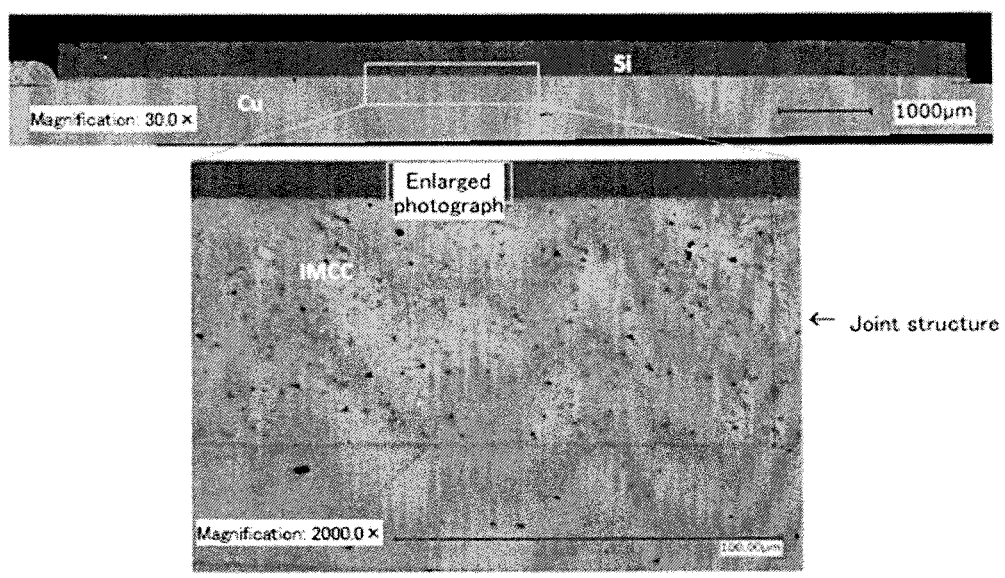
FIG. 6 presents optical microphotographs of a cross section of a joint area formed by joining a copper substrate and a silicon device using a joint material that contains the metal particle obtained in Example 1, and then by subjecting them to a thermal shock test.

FIG. 6 presents optical microphotographs of the cross section of the joint area formed by joining the copper substrate and the silicon device with use of the joint material that contains the metal particle 1, and then by subjecting them to a thermal shock test.

The thermal shock test was conducted 1000 cycles at a lower exposure temperature of −40° C. and a higher exposure temperature of 175° C.

As can be understood from FIG. 6, a good state of joint was retained, without causing decay of the joint area between the copper substrate and the silicon device, and without causing fracture of the silicon device.

Example 2

A metal particle 2 was manufactured in the same way as in Example 1, except by using a starting material composed of 8% by mass of Cu, 3% by mass of Ni and 89% by mass of Sn.

Next, 70% by mass of the metal particle 2, and 30% by mass of alloy powder composed of 90% by mass of Cu and 10% by mass of Ni were homogeneously mixed, and the mixture in a dry powder form was compressed to manufacture a sheet (50 μm thick). The sheet was then used for joining the copper substrate and the silicon device, and subjected to the high temperature storage test (HTS) at 260° C. Results indicated that shear strength elevated from approximately 60 MPa up to approximately 70 MPa, over a period ranging from the start of test until approximately 100 hours after, and remained plateau at approximately 60 MPa over a temporal range beyond 100 hours.

On the other hand, temperature cycle test (TCT) ranged from −40 to 200° C. yielded results indicating that the shear strength was stabilized at approximately 50 MPa over the whole cycles (1000 cycles).

Comparative Example 1

Figure 7A:
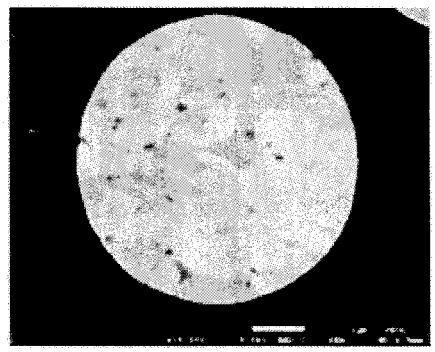
FIG. 7A is an STEM image of a cross section of an SnAgCu-based joint material in the prior art.
Figure 7B:
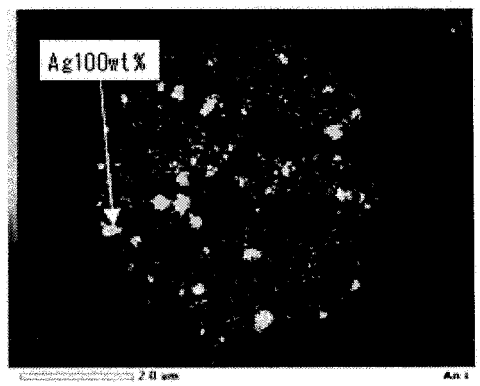
FIGS. 7B to 7D illustrate results of EDS element mapping.
Figure 7C:
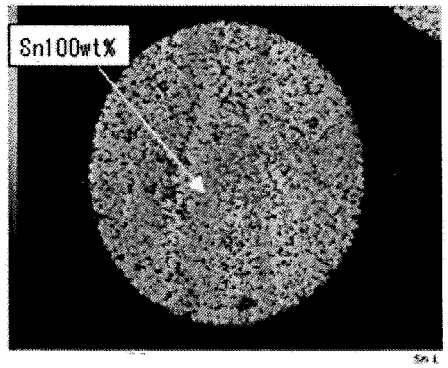
Figure 7D:
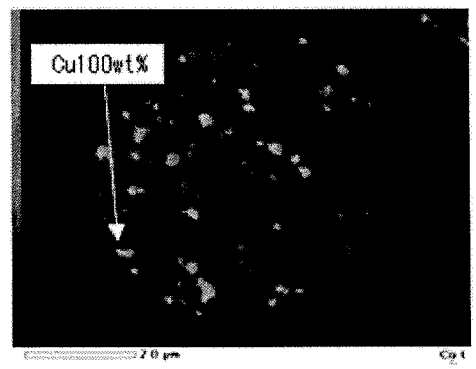

As a comparative example, FIG. 7A presents an STEM image of a cross section of an SnAgCu-based joint material (powdery solder material with a particle size of 5 μm) in the prior art, and FIGS. 7B to 7D illustrate results of EDS element mapping.

It was confirmed from FIGS. 7A to 7D that the prior SnAgCu-based joint material does not contain the intermetallic compound, instead having a single metal element dispersed therein. It was also confirmed that the Sn—Cu alloy of the metal basal phase does not have the high temperature phase crystal structure. Such prior SnAgCu-based joint material caused decay in the joint area in the temperature cycle test (TCT) ranged from −40 to 200° C., before going through 100 cycles, which was far from achieving heat resistance and strength comparable to those of the metal particle of this invention.

Figure 8:
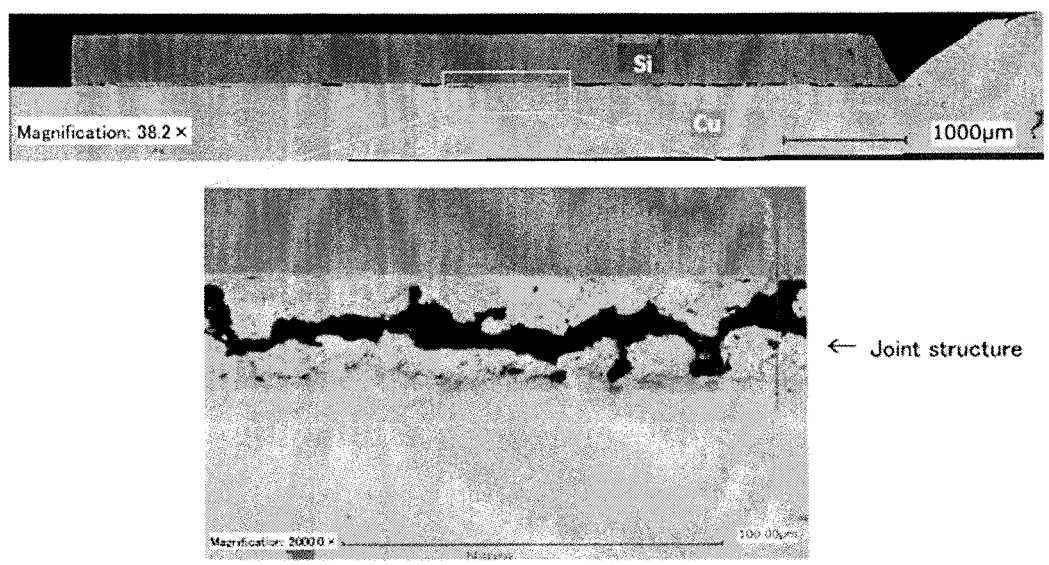
FIG. 8 presents optical microphotographs of a cross section of a joint area formed by joining a copper substrate and a silicon device using a joint material that contains the metal particle obtained in Comparative Example 1, and then by subjecting them to a thermal shock test.

FIG. 8 presents optical microphotographs of the cross section of the joint area formed by joining the copper substrate and the silicon device using the joint material obtained in Comparative Example 1, and then by subjecting them to the thermal shock test.

The thermal shock test was conducted 50 cycles at a lower exposure temperature of −40° C. and a higher exposure temperature of 175° C.

As can be confirmed from FIG. 8, the joint area between the copper substrate and the silicon device was found to decay as early as the 50th cycle after the start of the thermal shock test.

Having detailed this invention referring to the attached drawings, this invention is not limited to these Examples. It is apparent that those skilled in the art will easily arrive at various modifications, on the basis of basic technical spirit and teaching of this invention.

What is claimed is:

1. A metal particle comprising an intermetallic compound composed of Sn, Cu and Ni, in a basal phase that contains Sn and an Sn—Cu alloy, at least parts of the Sn—Cu alloy and the intermetallic compound in the basal phase forming an endotaxial joint.

2. The metal particle according to claim 1, having a particle size of 1 μm to 50 μm.

3. The metal particle according to claim 1, comprising 0.7 to 40% by mass of Cu, 0.1 to 5% by mass of Ni, and the balance of Sn.

4. The metal particle according to claim 3, having a particle size of 1 μm to 50 μm.

\* \* \* \* \*